United States Patent [19]

Stromswold et al.

[11] Patent Number: 4,568,830
[45] Date of Patent: Feb. 4, 1986

[54] BOREHOLE GAMMA RAY LOGGING DETECTOR

[75] Inventors: David C. Stromswold; Wyatt W. Givens, both of Dallas, Tex.

[73] Assignee: Mobil Oil Corporation, New York, N.Y.

[21] Appl. No.: 506,914

[22] Filed: Jun. 22, 1983

[51] Int. Cl.$^4$ ............................................. G01V 5/08
[52] U.S. Cl. ................................................... 250/261
[58] Field of Search ........................................ 250/261

[56] References Cited

U.S. PATENT DOCUMENTS

| | | | |
|---|---|---|---|
| 3,258,593 | 6/1966 | Reed et al. | 250/261 X |
| 3,289,743 | 12/1966 | Biro | 165/10 |
| 3,379,032 | 4/1968 | Wilson | 250/261 X |
| 3,940,610 | 2/1976 | Dennis et al. | 250/253 |
| 4,446,369 | 5/1984 | Givens et al. | 250/270 |

OTHER PUBLICATIONS

M. J. Weber and R. R. Monchamp, "Luminescence of Bi$_4$Ge$_3$O$_{12}$: Spectral and decay properties", *Journal of Applied Physics*, vol. 44, No. 12 (Dec. 1973), pp. 5495-5499, esp. FIG. 4.

Primary Examiner—Alfred E. Smith
Assistant Examiner—Constantine Hannaher
Attorney, Agent, or Firm—A. J. McKillop; Michael G. Gilman; George W. Hager, Jr.

[57] ABSTRACT

A gamma ray detector for borehole logging includes a bismuth germanate crystal having a sensitivity to gamma rays and giving off light energy proportional to the energy of detected gamma rays. The bismuth germanate crystal is mounted in a housing which allows the operating temperature of the crystal to be maintained under increasing borehole temperature with depth.

5 Claims, 3 Drawing Figures

BOREHOLE GAMMA RAY LOGGING DETECTOR

BACKGROUND OF THE INVENTION

This invention relates to a method and apparatus for nuclear well logging and more particularly to a new and improved gamma ray detector for measuring gamma radiation from formations surrounding a borehole.

Various methods and apparatus have been utilized in the well logging art to study the radioactive properties of subsurface formations, both where the radiation is natural and where it is artificially induced. Logs of such properties aid in the study of the nature of the subsurface formations, particularly in exploration for minerals and hydrocarbon deposits. One such method and apparatus utilizing the measurement of gamma radiation to identify subsurface formations is disclosed in U.S. Pat. No. 3,940,610 to Dennis et al. Such patent discloses a borehole logging tool having a gamma ray detector of the scintillation type which cooperates with a photomultiplier tube for detecting natural gamma radiation. The scintillation detector is a crystal of sodium iodide activated with thallium. The sodium iodide gives off quanta of light energy called photons, the intensity of which is proportional to the energy of the gamma ray interaction in the sodium iodide crystal. The photomultiplier tube responds to these photons to produce a succession of electrical pulses having magnitudes proportional to the energy of the gamma rays. These pulses are amplified and sent uphole to a surface recording system.

SUMMARY OF THE INVENTION

A borehole gamma ray logging system includes an instrument housing, means for moving the housing through the borehole and a logging instrument disposed within the housing. The logging instrument employs a bismuth germanate crystal having a sensitivity to gamma rays significantly greater than sodium iodide and giving off light energy in the form of photons proportional to the energy of the detected gamma rays. The detection efficiency and energy resolution of the crystal are maintained during logging operations by controlling or limiting changes in the light energy output of the crystal under increasing borehole temperatures with depth. Such control is accomplished by providing an operating environment for the crystal in which an operating temperature below 100° F. (311° K.) is maintained during logging operations under borehole temperatures up to at least 400° F. (478° K.).

DESCRIPTION OF THE PREFERRED EMBODIMENT

Figure 1:
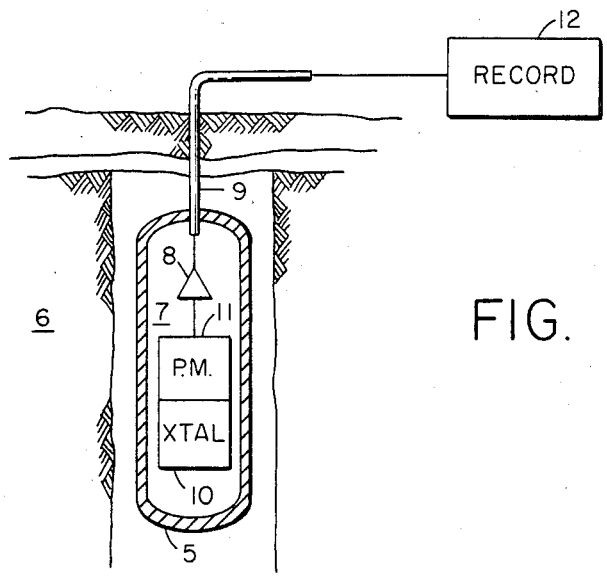
FIG. 1 illustrates a borehole logging system employing the gamma ray detector of the present invention.

Referring to FIG. 1, a borehole logging tool 5 measures natural or induced gamma radiation emitted by the subsurface formation 6. The borehole tool 5 includes the gamma ray detector 7 and an amplifier 8. The gamma ray detector 7 includes the scintillation type detector 10 which cooperates with a photomultiplier tube 11 to detect gamma radiation. The detector 10 is preferably a crystal of bismuth germanate which gives off quanta of light energy called photons, the intensity of which is proportional to the energy of the gamma ray interaction in the bismuth germanate crystal. The photomultiplier tube 11 responds to these photons to produce a succession of electrical pulses having magnitudes proportional to the energy of the gamma rays. These pulses are sent uphole by way of the amplifier 8 and the logging cable 9 to the recording system 12.

The gamma ray detector 7 employes a bismuth germanate ($Bi_4Ge_3O_{12}$) crystal supplied by Harshaw Chemical Company integrally mounted to a Hamamatsu R-1306 photomultiplier tube. In one embodiment, for example, the crystal is two inches (51 mm) in diameter and two inches (51 mm) long and is housed in an aluminum housing. The crystal is preferably operated at a voltage of about +1000 volts. Such a bismuth germanate detector offers significant enhancement to the gamma ray measurements over a sodium iodide detector which has been the standard scintillation-type detector used for many years in borehole logging. More particularly, bismuth germanate provides a several-fold enhanced counting efficiency over sodium iodide in the detection of high energy gamma rays, and it is much less susceptible to neutron activation when used in a borehole logging tool employing a neutron source for inducing gamma-ray emissions from the formations surrounding the borehole.

The increased counting efficiency of the bismuth germanate detector over the sodium iodide detector is of specific importance in the logging of gamma rays from naturally radioactive elements in subsurface formations. The count rates for natural spectral logging are low and the increase in counting efficiency offers much improved data quality. In one experiment both a bismuth germanate detector and a sodium iodide detector were used to count 1.78 MeV gamma rays from the activation of aluminum pellets in a sand and water mixture. The counts in the aluminum peak at 1.78 MeV were 3.7 times greater with the bismuth germanate detector. In another experiment both bismuth germanate and sodium iodide detectors were used to count 2.2 MeV gamma rays from the activation of hydrogen in water. The counts in the hydrogen peak at 2.2 MeV were 4.2 times greater with the bismuth germanate detector. In a still further experiment both bismuth germanate and sodium iodide detectors were used to count 4.4 MeV gamma rays from carbon in a graphite and water mixture. The counts in the carbon peak at 4.4 MeV were 6.2 times greater with the bismuth germanate detector. In each of the foregoing experiments both detectors employed cylindrical 2" by 2" (51 mm by 51 mm) crystals.

When used in a logging tool employing a neutron source for activating the subsurface formations, the bismuth germanate detector has a significantly lower neutron activation than the sodium iodide detector. This results in a lower background for the gamma ray count. Activation of the iodine in sodium iodine detectors has been a problem when operated in conjunction with a neutron source. In one experiment a 2" by 2" (51 mm by 51 mm) sodium iodide detector was shielded by a 5/16 inch (8 mm) thick layer of lithium powder to reduce the number of thermal neutrons reaching the detector and producing activation. The activation counts from the sodium iodide detector were 320 percent above background whereas the counts from the bismuth germanate detector were 35 percent above background. Thus the sodium iodide detector provided about nine times the activation counts of the bismuth germanate detector. The experiment was repeated for a sodium iodide detector without the lithium powder shielding. In this instance the sodium iodide detector provided about forty seven times the activation counts of the bismuth germanate detector.

Figure 2:
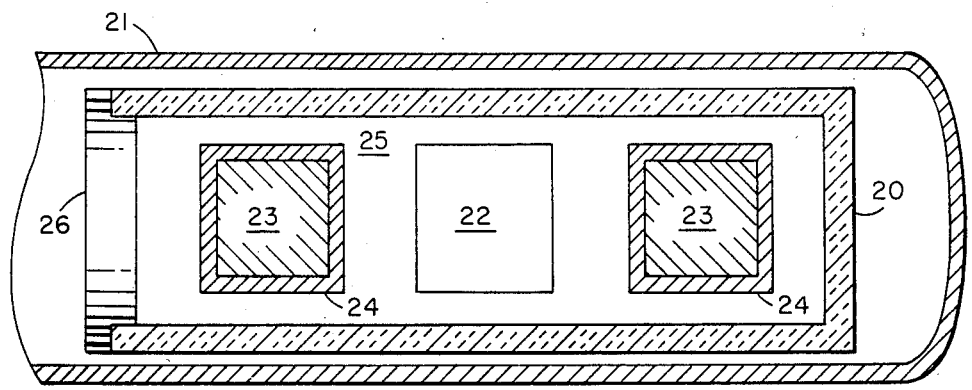

Referring now to FIG. 2 there is illustrated a preferred embodiment of a housing for the bismuth germanate crystal for limiting changes in the light energy output during logging operations under increasing borehole temperature with depth. A vacuum insulating flask 20 is located within the housing or pressure shell 21 of the logging tool. The instrumentation 22 to be cooled is placed within the inner chamber 25 of vaccum flask 20. The flask is closed by the insulating plug 26. This flask reduces the flow of heat into the interior chamber 25. Heat which does reach the interior of the flask is absorbed by a heat absorber or absorbers 23 through a change of phase from solid to liquid. The temperature within the flask is maintained near the melting temperature of the heat absorbing material until most of such heat absorbing material melts. In remote applications such as well logging such a temperature control unit of the present invention has the specific advantage of being passive, that is, it requires no electrical power input.

Maintaining the operating environment of the bismuth germanate crystal below about 100° F. (311° K.) is important because its performance degrades significantly as temperature rises. Such sensitivity to operating temperature is much greater for bismuth germanate than for sodium iodide. A particularly suitable heat absorbing material is gallium, a metal that melts at 86° F. (303° K.), has a heat of fusion (heat required for melting) of 19 calories per gram, and has a density of 5.9 grams/cm$^3$. These properties make it ideal as a compact heat absorber for use in the present invention. The gallium, or other suitable heat absorbing material, is contained in a metallic container or containers 24, such as copper, to facilitate heat transfer into the gallium, and to hold the liquid when the solid gallium begins to melt. In one experiment a vacuum flask, four feet long (1.2 m) with an internal diameter of 2.4 inches (61 mm) housed one kilogram of gallium contained in copper cylinders. A temperature of up to 392° F. (473° K.) was applied to the outside of the flask. The internal temperature remained below 90° F. (305° K.) for five hours due to the melting of the gallium.

Some materials other than pure gallium which are suitable for use as heat absorbers in borehole logging operations include alloys of gallium with indium and tin (which melt at 50° F. (283° K.) and 80° F. (300° K.) respectively) and ice (which melts at 32° F.) (273° K.). In an experiment using 380 grams of ice in the same vacuum flask used with gallium, the internal temperature of the flask remained below 40° F. (278° K.) for seven hours in the 392° F. (473° K.) environment.

Figure 3:
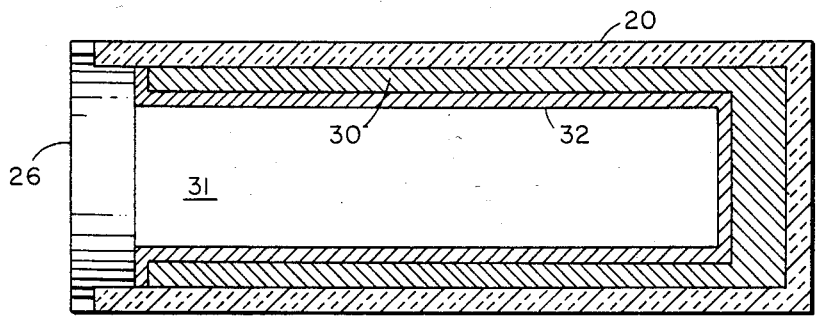
FIGS. 2 and 3 illustrate alternate embodiments for a housing for the gamma ray detector of the present invention for limiting changes in the light energy output during logging operations under increasing borehole temperature with depth.

An alternative embodiment for the temperature control unit of the present invention is shown in FIG. 3. In this embodiment the heat absorbing material is shown at 30 as a liner along the wall of the insulating flask 20 and surrounding the inner chamber 31. Such liner 30 is held in position against the inner wall of the vacuum insulating flask by the metallic liner 32. In a still further embodiment the insulating flask 20 and liner 30 may be replaced by a double walled housing with the heat absorbing material contained within the double walled housing. It can be appreciated that additional heat absorbing material may be placed in containers such as shown in FIG. 2 and placed in the inner chamber 31 of FIG. 3 to give added heat absorbing capability to that being provided by the heat absorbing material.

Having now described the present invention with respect to the foregoing embodiments, it is to be understood that various modifications may be made without departing from the spirit and scope of the invention as set forth in the appended claims.

We claim:

1. A gamma ray detector for borehole logging, comprising:
   (a) a vacuum insulating housing,
   (b) a bismuth germanate crystal located within said housing having a sensitivity to gamma rays and giving off light energy in the form of photons proportional to the energy of said detected gamma rays,
   (c) a heat absorbing material forming a lining for said housing, and
   (d) a heat conductive lining for holding said heat absorbing lining in place as said heat absorbing lining changes from a solid to a liquid state.

2. A borehole gamma ray logging system, comprising:
   (a) a double-walled vacuum housing,
   (b) a heat absorbing material located between the walls of said double-walled vacuum housing, said material forming a heat absorbing lining for absorbing heat through a change in phase from a solid to a liquid,
   (c) means for moving said housing through a borehole,
   (d) a logging instrument disposed within said vacuum housing, comprising:
      (i) a bismuth germanate scintillation detector havng a sensitivity to gamma rays and giving off light energy in the form of photons proportional to the energy of said detected gamma rays, and
      (ii) a photomultiplier tube which responds to the photons given off by said detector to produce electrical output pulses having magnitudes proportional to the energy of said detected gamma rays, and
   (e) a recording system for recording the output pulses from said photomulipler tube as a function of the depth of said instrument housing in said borehole.

3. A borehole logging tool, comprising:
   (a) a vacuum housing,
   (b) a gamma radiation detector located within said housing and having a sensitivity to gamma rays and giving off light energy in the form of photons proportional to the energy of said gamma rays, said detector employing a bismuth germanate crystal contained in a housing,
   (c) a heat absorbing material located within said housing, said material including sufficient gallium to maintain the temperature within said housing below 90° F. (305° K.) for at least five hours with borehole temperatures up to 400° F. (478° K.) and having a density of 5.9 grams per cubic centimeters,
   (d) a metallic container for facilitating heat transfer into said heat absorbing material and for holding said heat absorbing material as it changes from a solid to a liquid under increasing temperature.

4. The borehole logging tool of claim 3 wherein said heat absorbing material includes alloys of gallium with indium.

5. The borehole logging tool of claim 4 wherein said heat absorbing material includes alloys of gallium with tin.

* * * * *